United States Patent [19]
Fox et al.

[11] Patent Number: 5,705,742
[45] Date of Patent: Jan. 6, 1998

[54] SYSTEM AND METHOD FOR TESTING AN ENGINE

[75] Inventors: Robert E. Fox, St. Clair Shores, Mich.; David Fox, Cicero; David L. Lanham, Noblesville, both of Ind.

[73] Assignee: Trend Products, Inc., Warren, Mich.

[21] Appl. No.: 566,305

[22] Filed: Dec. 1, 1995

[51] Int. Cl.$^6$ ................................................ G01M 15/00
[52] U.S. Cl. ................................................ 73/116
[58] Field of Search .................... 73/115, 116, 117.2, 73/117.3; 340/439; 123/90.1, 188.11

[56] References Cited

U.S. PATENT DOCUMENTS

| | | |
|---|---|---|
| 4,370,884 | 2/1983 | Wöss et al. . |
| 4,448,063 | 5/1984 | Mudge et al. . |
| 4,483,184 | 11/1984 | Kunzfeld . |
| 4,483,185 | 11/1984 | Kunzfeld . |
| 4,848,717 | 7/1989 | Bevill ........................... 73/116 |
| 5,060,176 | 10/1991 | Nawa et al. . |
| 5,097,699 | 3/1992 | Sano et al. . |
| 5,349,850 | 9/1994 | Young . |
| 5,353,635 | 10/1994 | Saiki et al. . |
| 5,355,713 | 10/1994 | Scourtes et al. . |
| 5,417,109 | 5/1995 | Scourtes . |
| 5,435,192 | 7/1995 | Eagan et al. . |
| 5,471,871 | 12/1995 | Rogers ........................... 73/116 |
| 5,492,006 | 2/1996 | Beckett ........................... 73/115 |
| 5,547,304 | 8/1996 | Cascio ........................... 73/116 |

Primary Examiner—George M. Dombroske
Attorney, Agent, or Firm—Myers Liniak & Berenato

[57] ABSTRACT

A system and method are disclosed for motoring an engine using an external drive motor for the purpose of performing tests on same. The system and method is capable of operating in three separate modes, a horsepower testing mode, a valve train testing mode, and a lap simulation mode. In the lap simulation mode, for example, the operator may select by way of a computer how many laps are to be run, the length of each lap, and the exact RPM to be used during each second or time period of every lap. In such a manner, the operator may simulate actual races so as to determine how a particular engine or components thereof will stand up to anticipated racing conditions. Another aspect of this invention is the use of a laser affixed to the block for the purpose of measuring vertical valve movement during motoring of the engine. The use of such a laser overcomes numerous problems in the prior art caused by vibration, lighting, etc.

12 Claims, 16 Drawing Sheets

Microfiche Appendix Included
(3 Microfiche, 202 Pages)

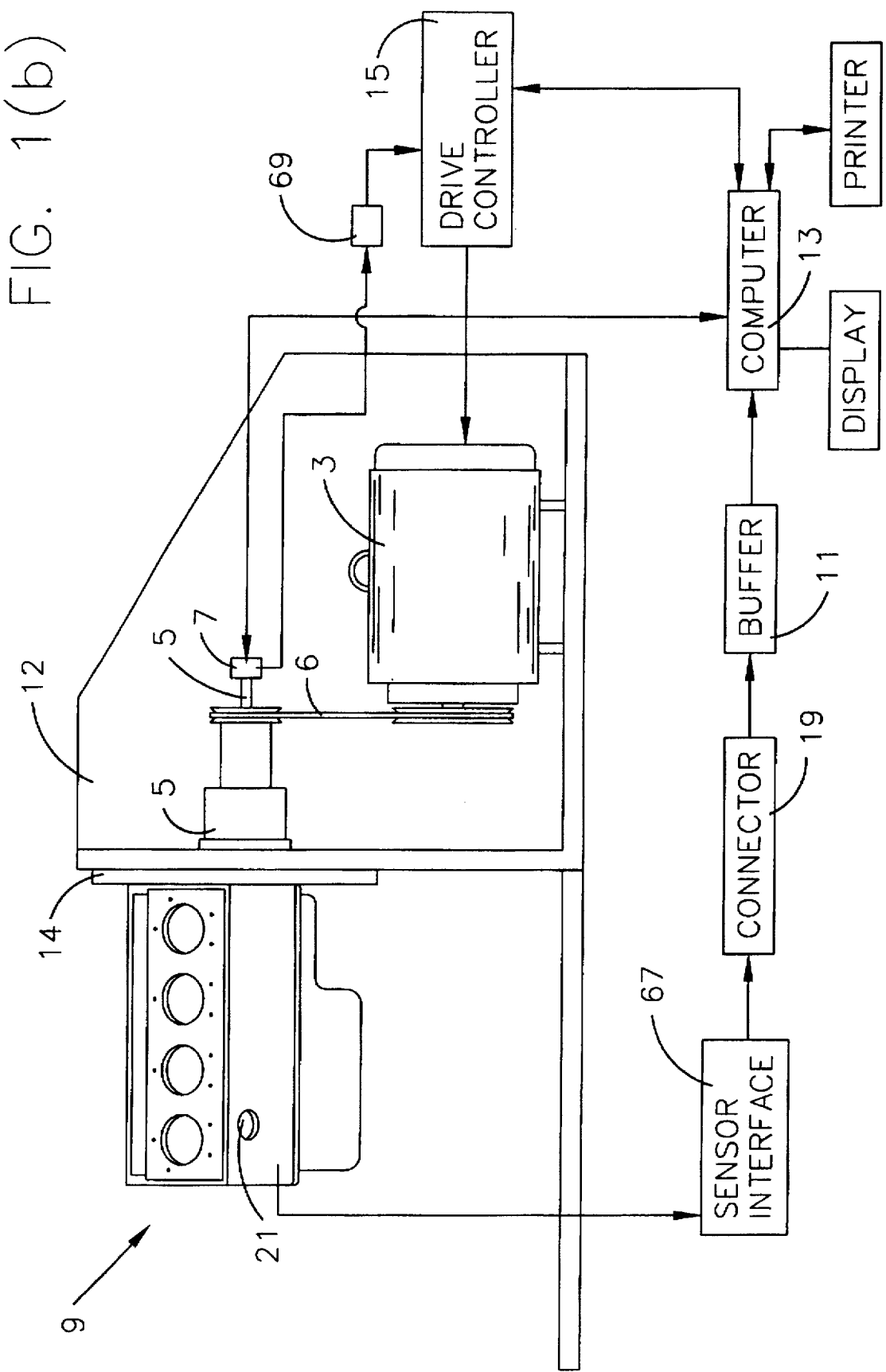

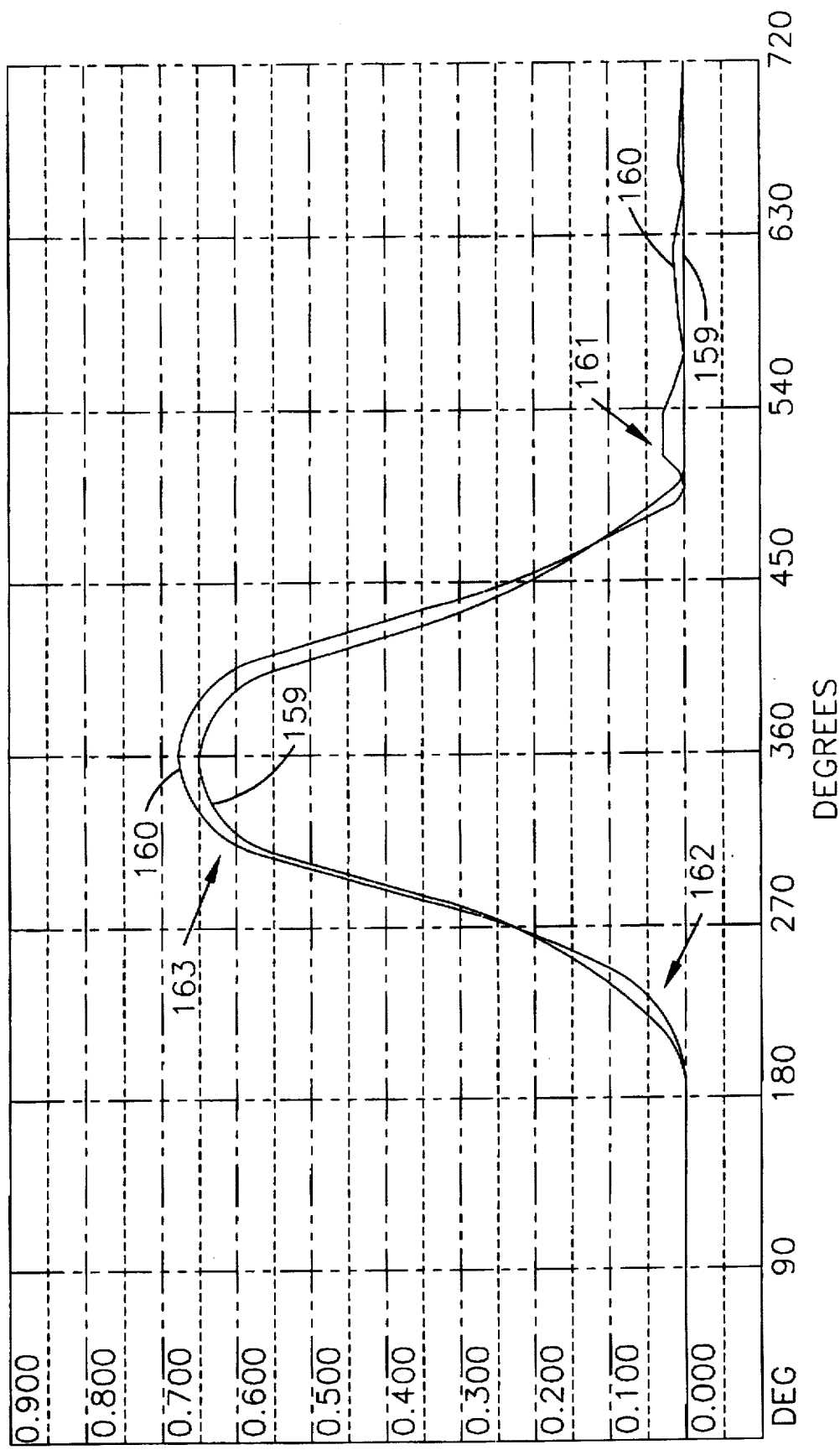

SYSTEM AND METHOD FOR TESTING AN ENGINE

This invention relates to a diagnostic system and method for testing an engine (i.e. rotating and testing an engine power train). More particularly, this invention relates to a system and method for driving (i.e. motoring) the engine to be tested by way of an external driving motor thereby enabling different tests to be run on various components and requirements (e.g. valve train analysis, horsepower required, lap simulation, etc.) of the engine as it is motored.

CLAIM TO COPYRIGHT IN REFERENCE TO MICROFICHE APPENDIX

A portion of the disclosure of this patent application contains material which is subject to copyright protection. The copyright owner has no objection to the reproduction by anyone of the patent document as it appears in the PTO files or records, but otherwise reserves all copyrights whatsoever. Software for carrying out some of the methods and systems described herein has been filed with the USPTO herewith in the form of a microfiche appendix including numerous frames, one of which being a title frame. The microfiche appendix is entitled "SYSTEM AND METHOD OF COLD TESTING ON ENGINE" and includes three (3) microfiche and 202 frames. Robert Fox and David Fox are listed as inventors on the microfiche appendix although David L. Lanham is also listed as an inventor on the application as filed.

BACKGROUND OF THE INVENTION

It is known to test automotive and other internal combustion engines either by driving the engine under its own power or by connecting the crankshaft of the engine to an electric or other driving motor which enables the rotary and reciprocatory parts of the engine under test to be driven. According to certain known systems, oscilloscopes are used to display singular curves of test data.

Testing of an engine that is operated under its own power requires the use of some mechanism, such as a dynamometer, for the imposition of loads on the engine. The dynamometer conventionally is either an A.C. or D.C. generator or the like. Unfortunately, the necessity of using a dynamometer increases the cost and time required to test engines. The testing of an engine while it is being operated under its own power enables a number of tests to be performed, such as horsepower output, fuel consumption, exhaust emissions, and the like. However, the operation of an engine under its own power also requires the burdensome provision of a mechanism to supply fuel, coolant, lubrication, and noise abatement. In addition, the operation of an engine under its own power necessitates the provision of elaborate ventilation systems to accommodate the engine exhaust.

Although the testing of an engine operating under its own power enables a good many tests to be performed, the integrity tests that can be imposed on the valve train, camshaft, crankshaft, engine block, and head are limited because of the engine's tendency to stall when the load on the engine is increased beyond the level that the engine can accommodate. In addition, certain defects, such as faulty valves and piston rings, are not always detectable during operation of the engine at relatively low operating speeds, unless the faults are of substantial proportions.

Driving an engine by some mechanism other than under its own power is known as "motoring" the engine. Motoring of an engine does not enable tests such as fuel consumption, exhaust emissions, and the like to be performed, but a great many other tests can be conducted. Motoring the engine also dispenses with the need for fuel storage and delivery system and obviates the need for exhaust ventilation systems.

In some known motoring systems, optron cameras are used to measure valve movement. Unfortunately, such cameras suffer from a number of problems such as malfunctioning or outputting faulty data as a result of engine vibration during motoring and/or non-perfect lighting conditions. Accordingly, it has been found by the instant inventors that there exists a need in the art for an improved system for measuring valve movement during motoring which functions properly in most all lighting conditions and during engine vibration.

U.S. Pat. No. 5,417,109 discloses a system for testing an engine by motoring the engine using an external electric motor coupled to the drive shaft of the engine under test. A drive speed controller is programmed by a computer, while an encoder is coupled to the controller and the computer so that the angular position of the drive shaft can be determined at all times. While the engine of the U.S. Pat. No. 5,417,109 patent is motored, the cylinders selectively may be maintained in an evacuated or a pressurized condition relative to ambient pressure, thereby enabling different tests to be performed which cannot be performed when the engine is operated under its own power. For example, the flow of exhaust gas from the exhaust port of each cylinder can be restricted or completely prevented by a restricter downstream of the exhaust port, thereby enabling one or more pressure sensors to monitor the pressure signal created by air trapped between the exhaust port and the restricter. This enables, among other things, valve leaks to be detected at low motoring speeds of the engine with a sensitivity of a few cc/min. As set forth in the U.S. Pat. No. 5,417,109 patent, signals generated by pressure changes are delivered to the computer where they can be monitored and evaluated to determine whether the intake and exhaust valves are seating properly and whether the piston rings are functioning properly.

Unfortunately, the system of the U.S. Pat. No. 5,417,109 patent has many limitations. For example, the signal processing aspect of the U.S. Pat. No. 5,417,109 system does not provide for detailed simulations of anticipated conditions or for direct overlay comparisons between, for example, test results at different RPMs.

U.S. Patent Nos. 4,483,185 and 5,355,713 also disclose systems for motoring engines in order to perform tests on same. While the U.S. Pat. No. 4,483,185 patent discusses piston stroke curves and valve-actuating cam curves, the system suffers from shortcomings similar to those discussed above with respect to the U.S. Pat. No. 5,417,109 patent.

Data analysis in the system of the U.S. Pat. No. 5,355,713 patent may be performed by computer using conventional spreadsheet programs such as Lotus or Excel. However, the U.S. Pat. No. 5,355,713 patent, while disclosing pressure transducers whose analog output is coupled to a data acquisition system so that measured waveforms may be analyzed using a computer and printer, is limited as to its capabilities as well.

It is apparent from the above that there exists a need in the art for a a system/method for motoring an engine throughout a large range of RPMs which allows detailed simulation and comparison testing to be performed at different RPM values. In such a manner, anticipated running conditions may be simulated (e.g. simulation of an actual race on a racetrack)

in an effort to determine in advance how different components of a particular engine will perform under predetermined circumstances or conditions at different RPM values.

SUMMARY OF THE INVENTION

Generally speaking this invention fulfills the above-described needs in the art by providing a method of testing valve movement in an engine being motored by an external drive, the method comprising the steps of:

motoring the engine to be tested by way of an external drive motor at a first RPM value so that a valve within the engine moves vertically upward and downward when the engine is motored;

affixing a laser sensor to the engine;

causing a laser beam from the laser to be directed at the bottom of the valve as the engine is being motored so that the laser outputs a signal indicative of vertical movement of the valve;

forwarding the signal from the laser to a computer; and plotting a first curve in graph form indicative of the valve movement detected by the laser so that the operator can determine whether the valve is operating properly when the engine is being motored at the first RPM value.

In certain preferred embodiments the method further includes the steps of:

measuring vertical movement of the valve using the laser at a second engine RPM value;

plotting a second curve in the graph form indicative of valve movement detected by the laser at the second RPM value;

overlaying the first and second curves on a graph; and analyzing the first and second curves on the graph so as to compare the behavior of the valve at the first RPM relative to the second RPM.

This invention further fulfills the above-described needs in the art by providing a system for testing various components and/or requirements of an engine, the system comprising:

an external drive motor for motoring the engine;

a computer including a display screen for permitting an operator to view graphical test data received from sensors mounted within an engine;

valve train testing means for measuring valve displacement during motoring at first and second RPM values, the valve train testing means forwarding signals indicative of valve displacement to the computer so that valve movement at the first and second RPM values is simultaneously displayed to the operator on the display screen; and lap simulation testing means for automatically motoring the engine for a predetermined number of laps around a simulated track at predetermined RPM values at a plurality of predetermined time periods defining each of the laps, and testing at least one component of the engine during each of the time periods during each lap thereby allowing the operator to analyze the behavior of the component being tested under simulated race conditions at different RPM values.

This invention will now be described with respect to certain embodiments thereof, accompanied by certain illustrations wherein:

IN THE DRAWINGS

FIG. 1(b) is a side elevational view illustrating the engine being motored by the external drive according to a preferred embodiment of this invention.

FIG. 9(b) is a graph illustrating the vertical movement of another valve within an engine as measured by a laser at two different RPMs.

DETAILED DESCRIPTION OF CERTAIN EMBODIMENTS OF THIS INVENTION

Figure 1A:
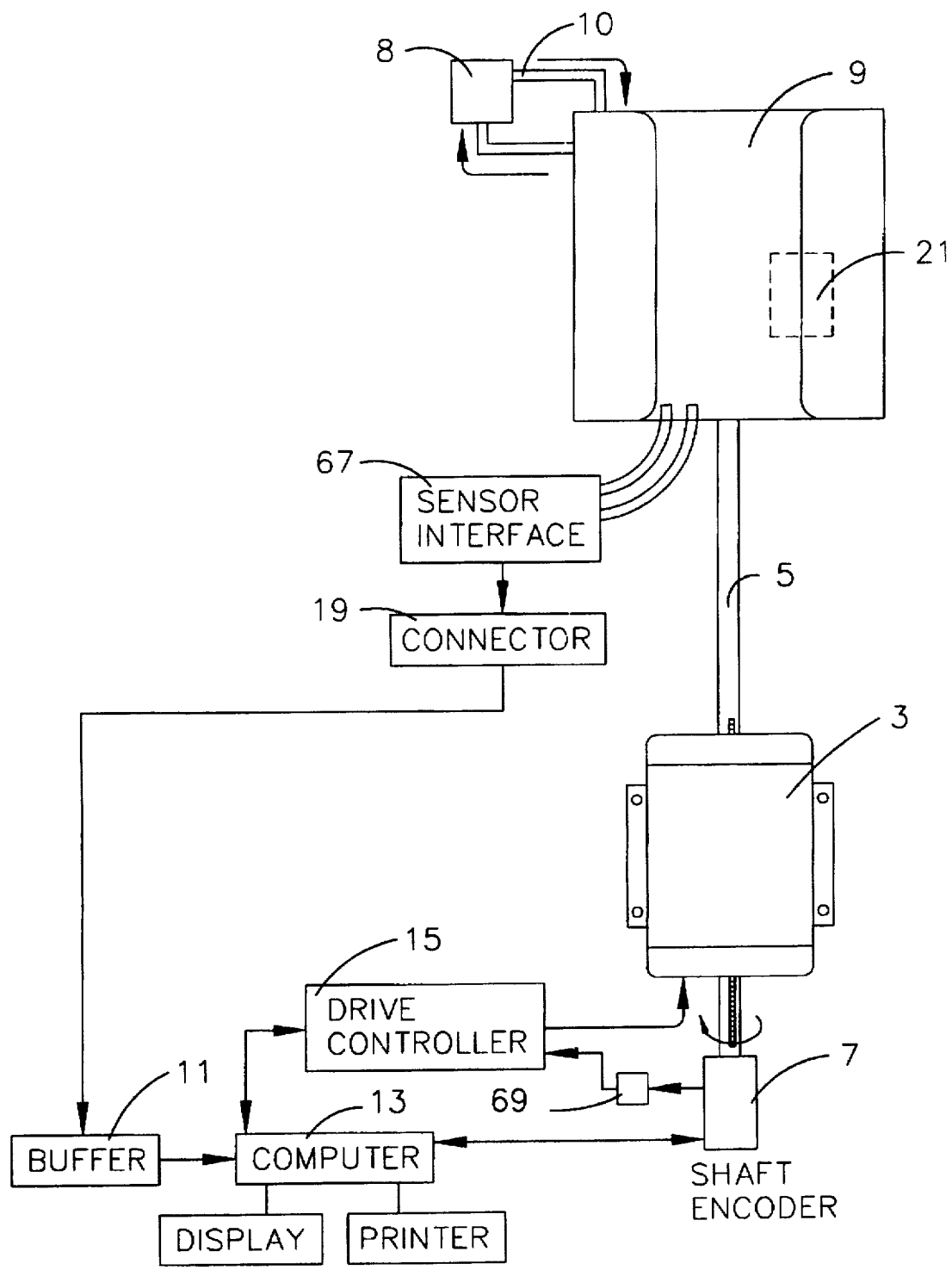
FIG. 1(a) is a diagrammatic view of a system/method according to an embodiment of this invention which motors an engine and performs tests upon same.

Referring now more particularly to the accompanying drawings in which like reference numerals indicate like parts throughout the several views.

FIG. 1(a) illustrates external electrical drive motor 3 which drives spindle or crankshaft 5, shaft encoder 7, oil pump 8, oil lines 10, engine 9 to be motored and tested, buffer 11, computer 13, motor drive controller 15, analog sensor interface plate 67, connector 19, divide-by-six box 69, and aperture 21 for permitting laser 84 (see FIG. 8) to be affixed to the block 9 for measuring vertical valve 45 movement.

Engine 9 under test may be a complete engine capable of running on its own except that it is not supplied with a fuel induction system. Alternatively, engine 9 may be void of a crankshaft and pistons with spindle 5 effectively functioning as the crankshaft of engine 9 as the engine is motored by external motor 3. Accordingly, the operator may spin only a portion of an engine so that areas of the engine normally occupied are accessible (e.g. for sensor positioning). For example, valve tests may be run with the pistons removed so that the operator does not have to deal with combustion or piston movement.

In either event, engine crankshaft/spindle 5 is coupled to variable speed external drive motor 3 through a conventional coupling. Shaft encoder 7 is attached to the end of crankshaft 5 and produces an output signal corresponding to the angular displacement or position of shaft 5 thereby also indirectly indicating the angular position of the engine cam shaft. Encoder 7 is powered by computer 13 and is coupled to drive controller 15 by way of divide-by-six box 69 so that the speed of motor 3 and shaft 5 may be controlled at predetermined or manually selected RPM values. Computer 13 and controller 15 are in communication with one another, while buffer 11 is actually a part of computer 13 as is a data acquisition board which receives test or measurement data from sensors mounted within engine 9. The serial port of the computer communicates with the serial port of controller 15 in order to control acceleration and deceleration of motor 3. Sensor interface 67 is in communication with all sensors withing engine 9 and permits the measured data to be forwarded to buffer 11 and computer 13 by way of connector 19 during motoring of the engine under test.

FIG. 1(b) is a side elevational view of a system for motoring and testing engine 9 according to a preferred embodiment of this invention. As shown, external drive motor 3, pulley belt 6, encoder 7, and the coupling device for connecting shaft 5 to engine 9 are substantially enclosed within cabinet 12. External motor 3 drives belt 6 which in turn rotates crankshaft 5. Crankshaft 5 in turn rotates within engine 9 causing the valve assembly to behave in a conventional manner and causes encoder 7 to output angular indicative signals.

In the FIG. 1(b) embodiment, engine 9 is connected to cabinet 12 by way of spacer or adapter plate 14. The instant inventors have found that the provision of plate 14 (which efficiently fits on cabinet 12) to which engine 9 is affixed greatly aids in the attachment and detachment of different engines 9 to cabinet 12 and thus external drive 3. The electrical system and oil pump of FIG. 1(b) are similar to that of FIG. 1(a).

Figure 2:
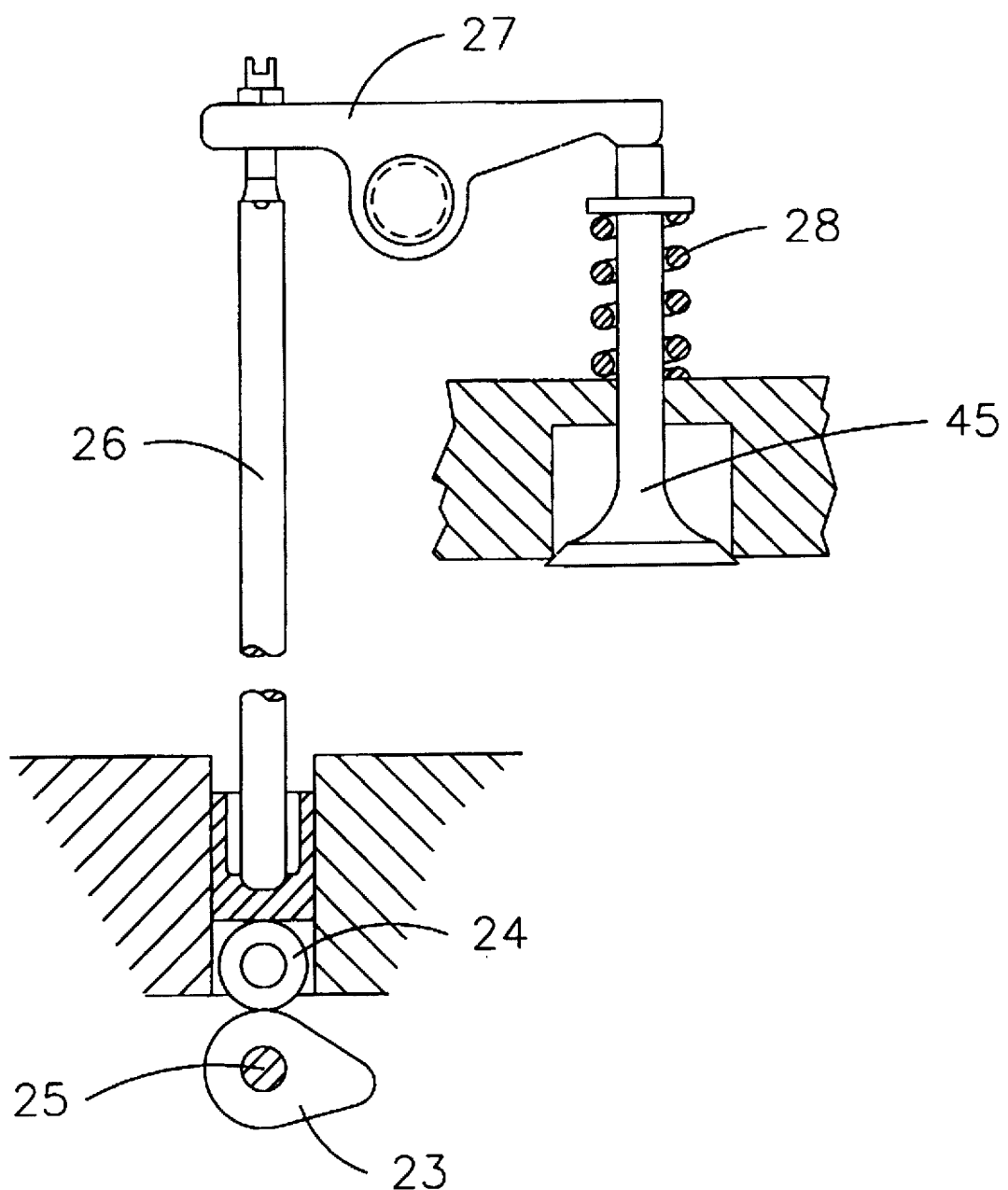
FIG. 2 is a side elevational cross-sectional view of a valve assembly of the engine shown in FIGS. 1(a) and 1(b), this view including the valve, valve spring, push rod and rocker arm of the valve assembly.

FIG. 2 is a side elevational cross-sectional view of a valve assembly within engine 9, which is particularly relevant with respect to valve train test mode 106. The valve assembly includes cam 23, follower 24, cam shaft 25, push rod 26, rocker arm 27, valve spring 28, and valve 45. Reciprocably mounted within the cylinder may be a piston (not shown) which is spaced from the head so as to provide a variable volume combustion chamber between the head and the piston, as is conventional. Cam shaft 25 makes one rotation for every two rotations of crankshaft 5 as will be appreciated by those of skill in the art. In communication with the piston chamber are an intake passage and an exhaust outlet passage. These passages have intake and exhaust ports that are opened and closed by intake and exhaust valves. Valve 45 is displacable to its open position as a function of the movement of cam 23, follower 24, push rod 26, and rocker arm 27 as is known in the art. It is an object of this invention in valve train testing mode 106 to measure vertical movement of valve 45 at different RPMs of crankshaft 5 as engine 9 is motored by external drive 3. Thus, valve bounce, float, and delay may be detected by analyzing data taken from the valve assembly at different RPMs. As an example, valve float is often caused by overspeed of cam shaft 25 (i.e. lifter comes off shaft) or excess pressure in the manifold while valve bounce can be caused by excessive seating velocities as the valve is closed. In other situations, valve bounce (i.e. not keeping combustion in the chamber) may be caused by damaged valve springs 28. Accordingly, it is an object of this invention to enable an operator to detect such problems by motoring the engine and analyzing measured test data taken therefrom during motoring at different RPMs so as to alert the operator to current or future limitations of the valve assembly (or components thereof) under test. Upon determining limitations of particular engine components, such as valves, the operator may redesign same in an effort to improve the behavior of the component at, for example, high RPM values.

Figure 3:
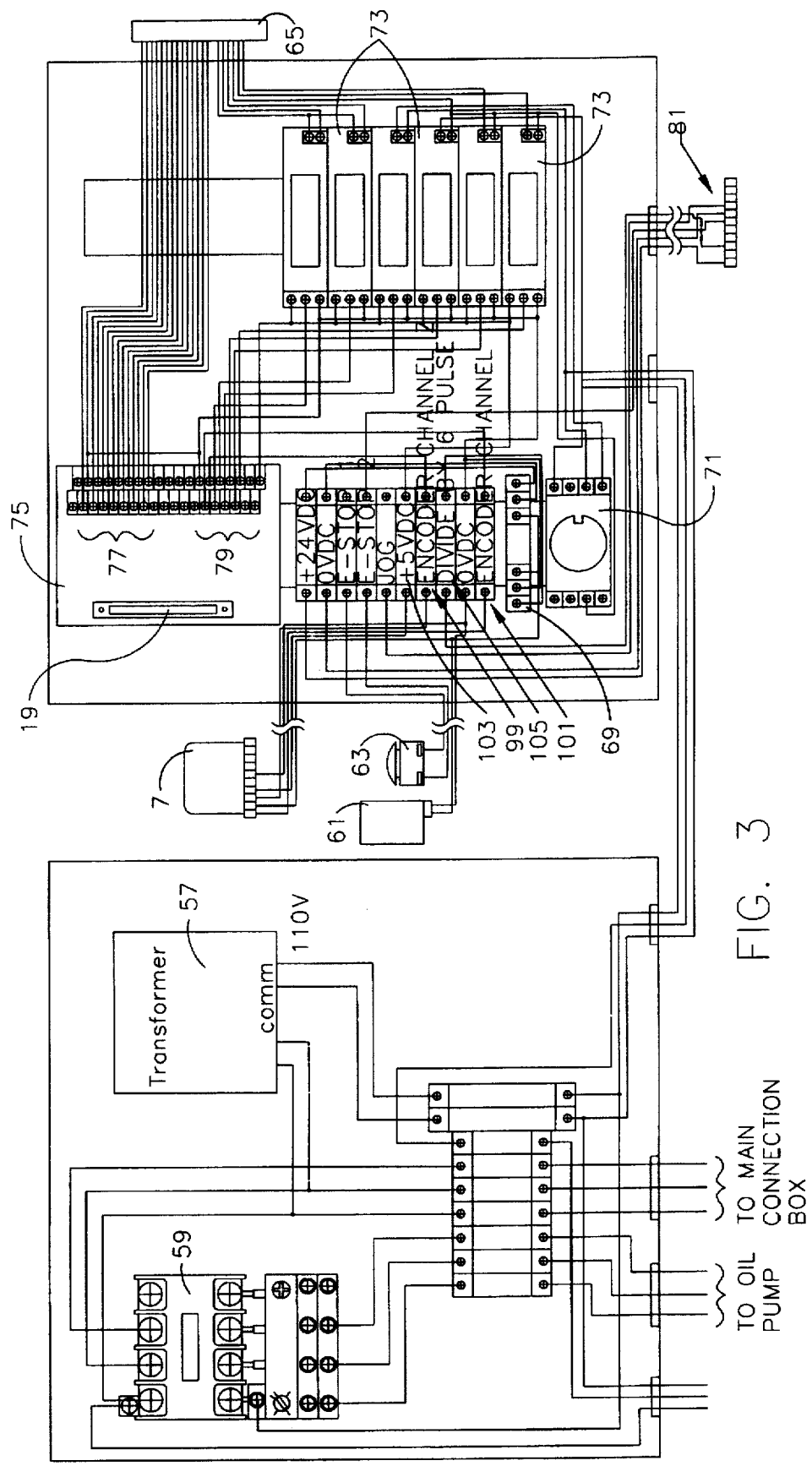
FIG. 3 is an electrical diagram of the system shown in FIG. 1(a) and/or FIG. 1(b).

FIG. 3 is an electrical diagram illustrating the circuitry and components associated with the system of the embodiment shown in FIGS. 1-2 which are mounted on a plate within cabinet 12. As viewed, the majority of the left hand portion of the circuit diagram including transformer 57 and oil pump relay 59 is provided for the purpose of activating and controlling oil pump 8 which functions to pump lubricating oil to and from engine block 9 by way of hoses 10 during motoring.

Figure 4A:
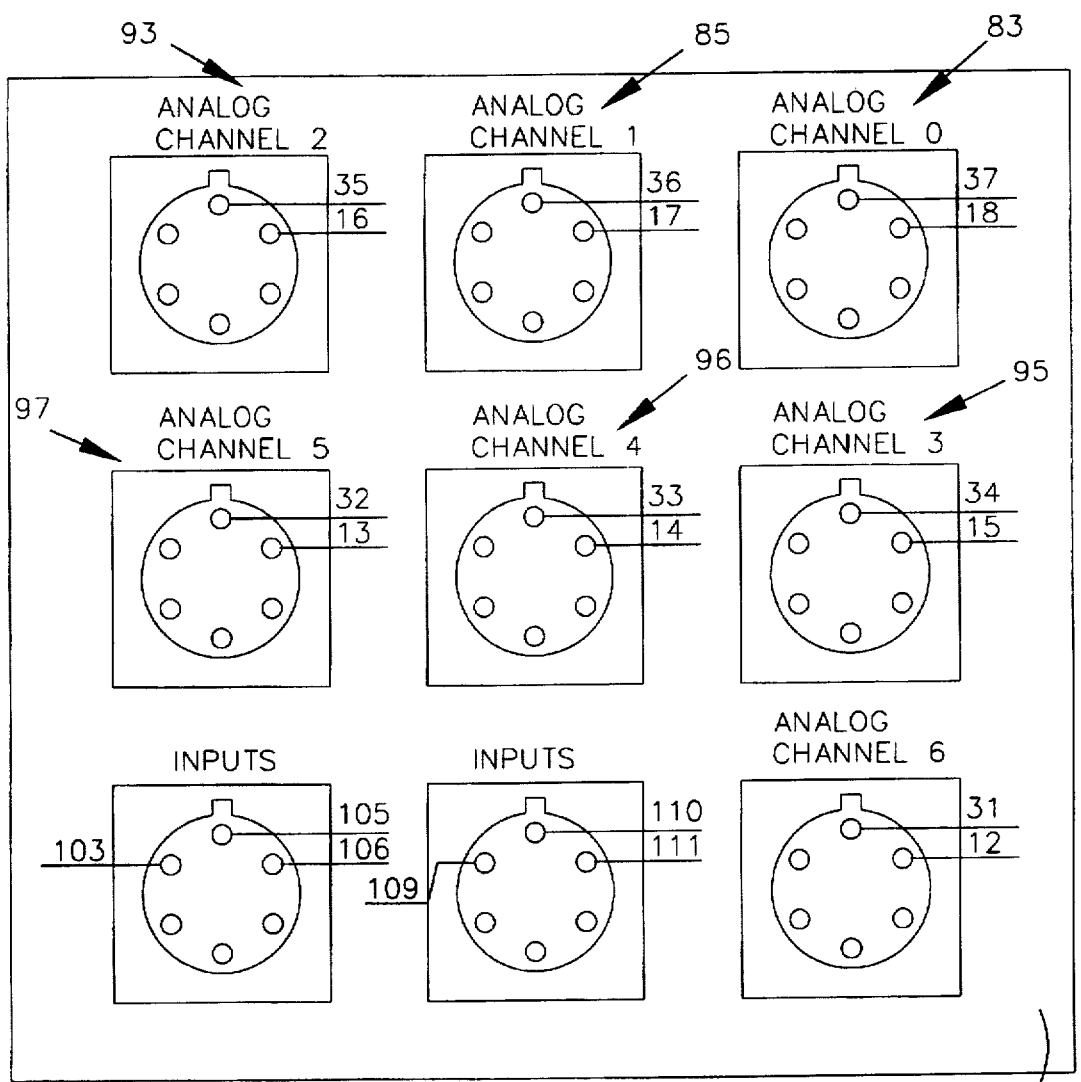
FIG. 4(a) is an electrical diagram of the analog sensor interface, the interface being in communication with the analog section shown in FIG. 3.
Figure 4B:
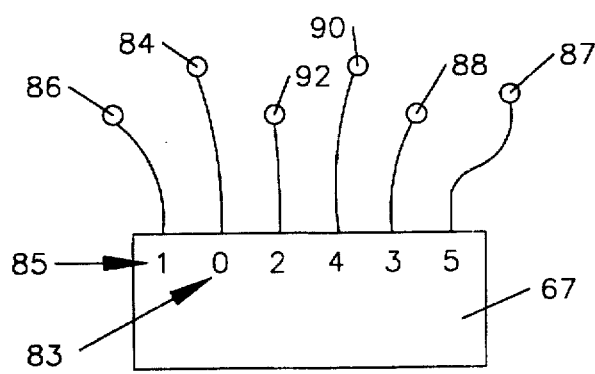
FIG. 4(b) is an electrical diagram of the interface of FIG. 4(a) showing a plurality of analog sensors mounted within the engine being connected to different channels of the interface.

Shifting to the right hand side of the electrical diagram of FIG. 3, there is illustrated the electrical relationship between shaft encoder 7, tachometer 61, E-stop device 63 (a manual stop button which functions to halt motoring of engine 9 when necessary), connector 65 which leads to analog sensor interface plate 67 (see FIG. 4(a)–4(b)), divide-by-six box 69, double pole double throw relay 71, modules 73, connector 19 which provides communication between engine 9 and computer 13, terminal 75 having analog contacts 77 and digital contacts 79, and finally drive connection 81. Analog contacts 77 and digital contacts 79 provided on terminal 75 are in communication with connector 19 thereby providing for communication with computer 13. Computer 13 (with its keyboard) and tachometer are located at the operator terminal remote from cabinet 12 and engine 9.

Analog sensor interface plate 67 as shown in FIG. 4(a) is provided inside cabinet 12 for the purpose of permitting a plurality of analog sensors (see FIG. 4(b)) to be mounted within engine 9 for monitoring and testing different engine 9 components during motoring. The different analog sensors mounted within engine 9 are in communication with interface 67 which in turn is in communication with connector or terminal 65. In such a manner, analog signals from each sensor positioned within the engine are passed through interface 67 and connector 65 to analog contacts 77. From contacts 77, the data signals are communicated to computer 13 by way of connector 19 and buffer 11.

As shown in FIG. 4(b), sensor interface 67 has a plurality of channels (up to about eight) thereby enabling a plurality of different sensors to be positioned within the engine being motored, one sensor per channel. For example, analog channel zero (see reference numeral 83) may be connected to laser sensor 84 (see FIG. 8) which is affixed withing aperture 21 in the block and measures the vertical movement of valve(s) 45 within the engine during motoring. The analog output from laser 84 goes through interface 67 and thereafter to contact numbers eighteen and thirty-seven at contact area 77. In such a manner, the output of laser 84 indicative of vertical valve movement is communicated to computer 13 by way of terminal 75 and connector 19.

As a further example, analog channel one from interface 67 (see reference numeral 85) may be connected to oil temperature sensor 86 (see FIG. 4(b)) so that the output of oil temperature sensor 86 is communicated by way of channel one to contact numbers seventeen and thirty-six in area 77 and thereafter to computer 13. Such data may be used according to certain embodiments of this invention to automatically shut down motor 3 if the oil temperature reaches too high a level.

In a similar manner, channel five of interface 67 may be connected to temperature sensor 87 which, for example, measures the temperature of a particular valve spring 28 in engine 9. Thus, the analog output from temperature sensor 87 is communicated by way of channel five to contact numbers thirteen and thirty-two in area 77 and thereafter to computer 13. Likewise, analog sensor 88 may measure the oil pressure within engine 9 and communicate same through channel three, while analog sensor 90 connected to analog channel four may represent a strain gauge on a push rod 26 or under a valve spring 28 for the purpose of indicating to computer 13 the strain on a particular push rod or under a particular valve spring. Analog sensor 92 communicating by way of channel two may be a flow meter measuring the fuel flow, coolant flow, or oil flow, for example, within engine 9 during motoring. Other potential analog sensors (unipolar or bipolar) for testing selected engine components which may be connected to interface plate 67 by way of any one of the plurality of analog channels include vacuum measuring devices, optron cameras, vibration transducers mounted on block or valve cover, proximity sensors, linear variable displacement transducers (LVDTs), strain gauges, and different temperature and pressure measuring devices. The user must input low and high voltages for each sensor by way of computer 13. Digital sensors may also be used to obtain data according to certain embodiments of this invention. Signals from all sensors may be postponed on the same display screen or graph which is an improvement over the prior art.

Through the use of sensor interface 67, the outputs of the plurality of analog sensors 84, 86, 87, 88, 90, 92 may be simultaneously printed, viewed, and/or analyzed by the user through computer display 13 as engine 9 is motoring or after motoring is complete.

Comparing FIGS. 4(a) and 4(b), channel zero from interface 67 shown in FIG. 4(b) corresponds to channel zero in FIG. 4(a) which is pointed out by reference numeral 83. Reference numeral 85 points out channel one in FIG. 4(a) while reference numeral 93 points out channel two, reference numeral 95 points out channel three, reference numeral 96 points out channel four, reference numeral 97 points out channel five, and so forth.

The electrical circuitry shown in FIG. 3 is mounted on a steel panel inside of cabinet 12 according to certain embodiments of this invention. Encoder 7 attached to crankshaft 5 has three channels, A, B, and Z according to certain embodiments. Encoder 7 may be, for example, a BEI encoder outputting 360 pulses per revolution of crankshaft 5. Channel Z is the marker pulse used to initiate data collection from the sensors. Each pulse represents a data point. Encoder 7 reads and outputs the true crank 5 speed. Channel Z of encoder 7 is indicated by reference numeral 99 in FIG. 3 while channel A is indicated by reference 101. As shown, channels A and Z are in communication with contact area 79 and thus computer 13.

E-stop device or button 63 is a manual switch which functions to halt motoring of engine 9 if problems develop. As shown, stop member 63 is in communication with drive connection 81. Tachometer 61 connected to encoder 7, divide-by-six box 69, and digital contact area 79 outputs RPMs for the user or operator to observe at the operator's terminal.

Positive five volt DC power 103 functions, for example, to provide power for encoder 7 and oil pump 8 while relay 71 is a master control relay which enables all outputs. Relay 71 may be, for example, an Allen-Bradley 120 volt double pole-double throw relay.

Divide-by-six box 69 (available from CIM Systems, Inc., Indiana) takes 360 pulse five volt square waves from channel B of encoder 7 and converts same to sixty pulse twelve volt square waves used for drive feedback for speed regulation of shaft 5. Accordingly, box 69 is in communication with drive connection 81 and controller 15 by way of divide-by-six pulse terminal 105.

Modules 73 may be, for example, optical relays available from Western Reserve (e.g. Model Nos. 1781-IA5S or 1781-OA5S). The top two modules 73 are for digital inputs while the bottom four modules are for digital outputs.

At connection 81, pin seventeen may be used for a feedback pulse, pin twenty-seven for E-stop, pin twenty for zero volts, and pin twelve for positive twenty-four volts.

Figure 5:
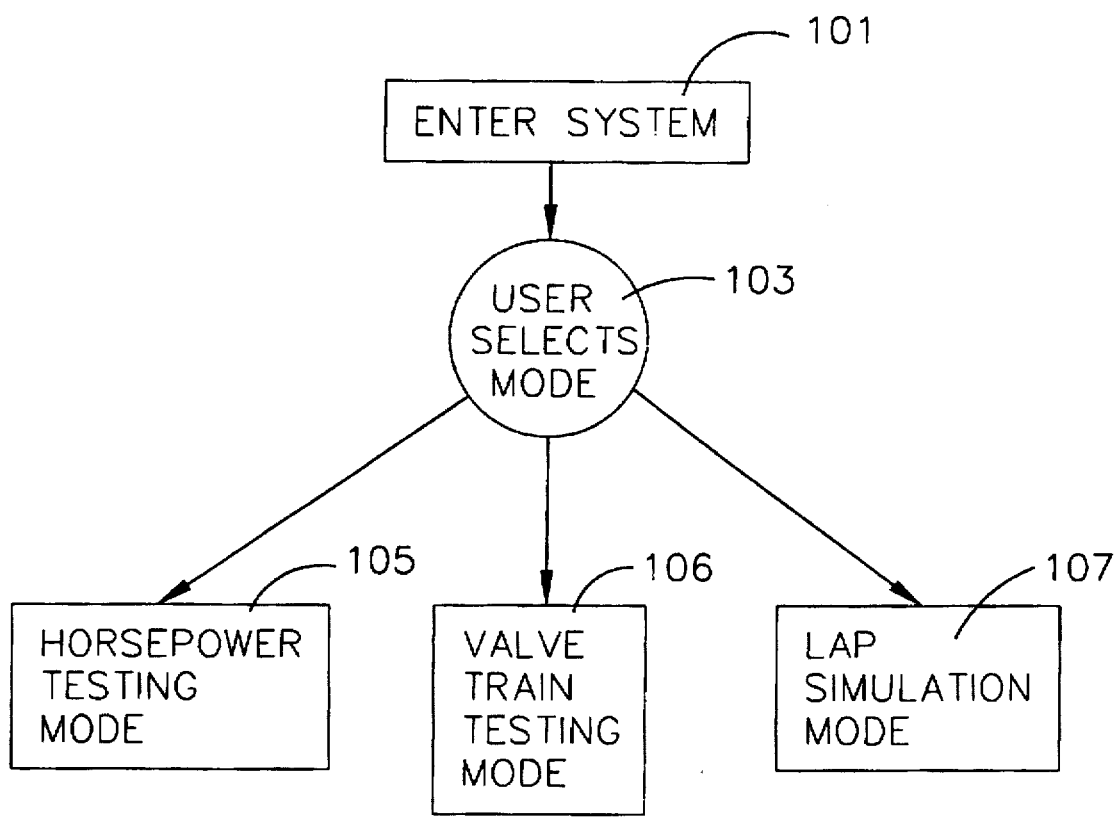
FIG. 5 is a block diagram/flowchart illustrating how a user according to certain embodiments of this invention may select from among horsepower, valve train, and lap simulation testing modes.

FIG. 5 is a block diagram/flowchart illustrating how a user or operator of the instant invention may access different testing modes. As shown, after entering the system at 101 (i.e. turning on computer 13 which uses windows based software), the user selects the preferred mode of operation/ testing at 103. As illustrated, the user may select horsepower testing mode 105, valve train testing mode 106, or lap simulation testing mode 107. Only one mode 105–107 may be selected at a time, although a plurality of different analog sensors may be utilized simultaneously in each mode as set forth above.

Figure 6:
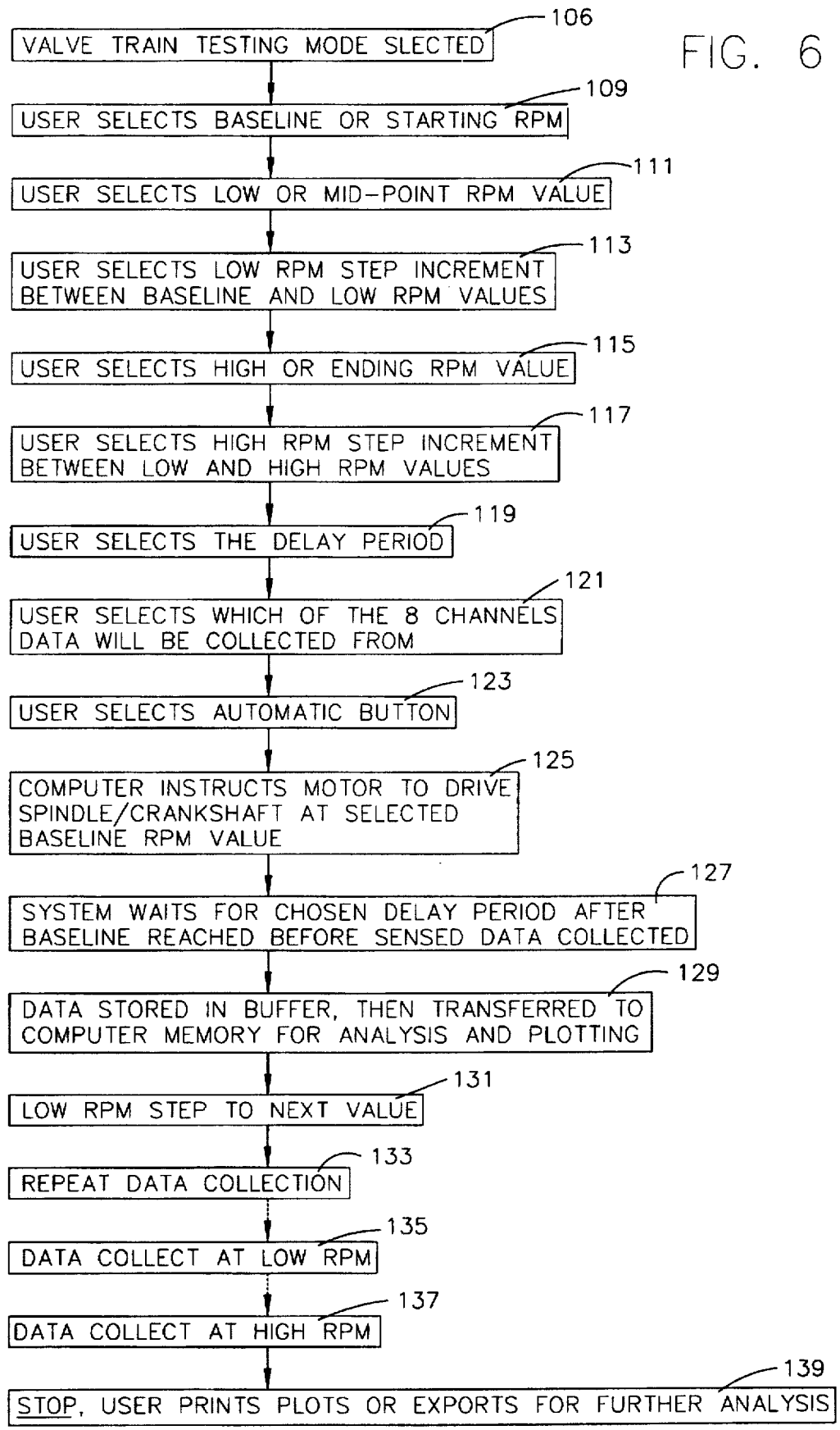
FIG. 6 is a block diagram/flowchart of the valve train testing mode of FIG. 5.

FIG. 6 is a block diagram/flowchart of the case where in step 103 the operator at computer terminal 13 selects valve train testing mode 106. The user begins by entering the baseline or starting RPM at step 109 through the keyboard (not shown) of computer 13. The baseline RPM selected is that which external motor 3 originally drives engine 9 to in order to begin testing. The user then selects the low or mid-point RPM value in step 111 and the low RPM step increment at 113. Explaining by way of example, if the baseline RPM value is 500, the low RPM value is 1,000, and the low RPM step value is 100, then tests will begin at the baseline value of 500 RPM, then step up to 600 RPM where more tests will be run. The next step is up to 700 RPM (more tests) with the next steps being 800 and 900 RPM (more tests) until finally the low RPM value of 1,000 RPM is reached using the low step increments. Tests are not run between RPM steps.

After selecting the low RPM step at 113, the user is then prompted to select the high RPM value at 115 and the high RPM step increment at 117. The delay period is selected at 119. Assuming the previous example of a low RPM value of 1,000 RPM and the fact that the user selected a high RPM value in step 115 of 5,000 RPM and a high RPM step increment of 1,000 RPM, then measurements are taken at the low RPM value of 1,000 RPM, and every step or increment (i.e. 2,000 RPM, 3,000 RPM, and 4,000 RPM) up to and including the high RPM value of 5,000. After the 5,000 RPM measurements are taken on engine 9 being motored, the system is shut down in the valve train mode.

The delay period selected in step 119 is the period of time which the system waits after reaching a particular RPM to take measurements. For example, if the delay period is selected to be two seconds, then upon reaching the high RPM value of 5,000 RPM, the system will wait two seconds before taking and analyzing data from the analog sensors attached to interface 67.

After selecting the delay period, the user selects which of the plurality of analog channels from interface 67 will be utilized in step 121. Then, the automatic button is selected in step 123. At this point, computer 13 automatically instructs at 125 external drive motor 3 to spin crankshaft 5 at the baseline RPM value selected in step 109 (e.g. 500 RPM). Then, at 127, the system automatically waits for the selected delay period after the baseline value is reached before the data collected by the analog sensors is stored and analyzed by computer 13. The analog data from each sensor attached to interface 67 is first stored in buffer 11 and then transferred to the memory in computer 13 for analysis and plotting as shown at 129 (e.g. using an Excel spreadsheet).

After measurements are taken at the baseline RPM value, the RPM of engine 9 by way of crankshaft 5 is increased by an amount equal to the low RPM step increment chosen in step 113. For example, if the low step was chosen to be 100 RPM, then the next RPM value at which measurements are taken is the baseline RPM value plus 100. After the next RPM value (e.g. 600) is reached at 131, the data collection process is repeated at 133.

After the engine is stopped up to and the data is finally collected from the analog sensors at the low RPM value (e.g. 1000) at 135, the RPM of shaft 5 and engine are automatically repeatedly stepped upwardly toward the high RPM value by step increments selected at 117 (with measurements being taken at each step) until the high RPM value is finally reached and measurements taken at 137. After measurements are taken at the high RPM value in step 137, the system is automatically stopped at 139 (external drive motor 3 is shut down) and the operator is free to view in graph form the data collected on computer screen 13, print the data collected in graph form, and/or store the data collected in a valve train data base for later viewing, printing, and/or exporting to an Excel spreadsheet for example for further analysis. Computer 13 may be, for example, a Gateway Pentium P575 75 MHz PC utilizing Windows based software.

Figure 7:
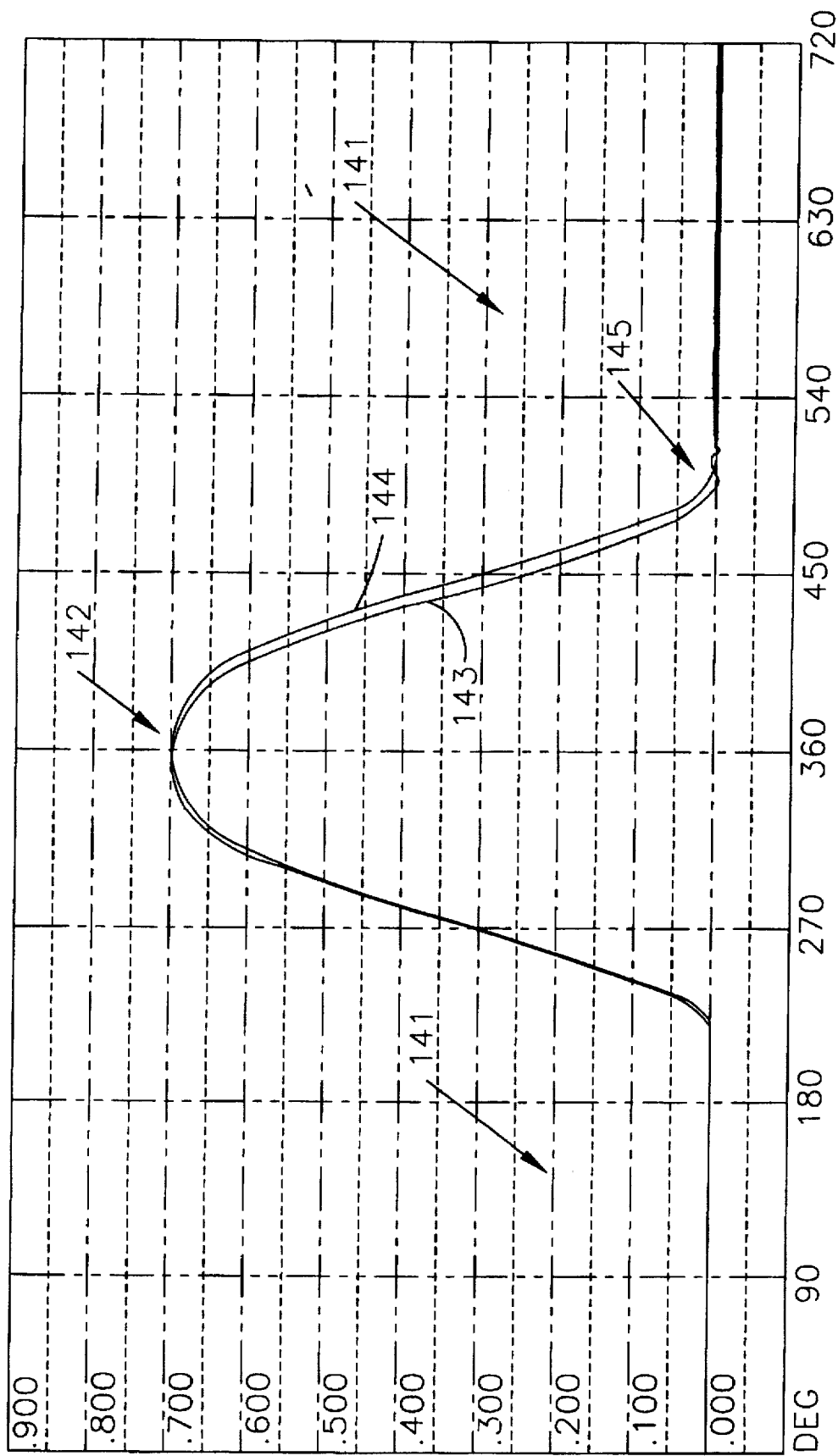
FIG. 7 is a graph illustrating the vertical movement of a valve as detected by a laser mounted in the engine during the FIG. 6 valve train testing mode.
Figure 8:
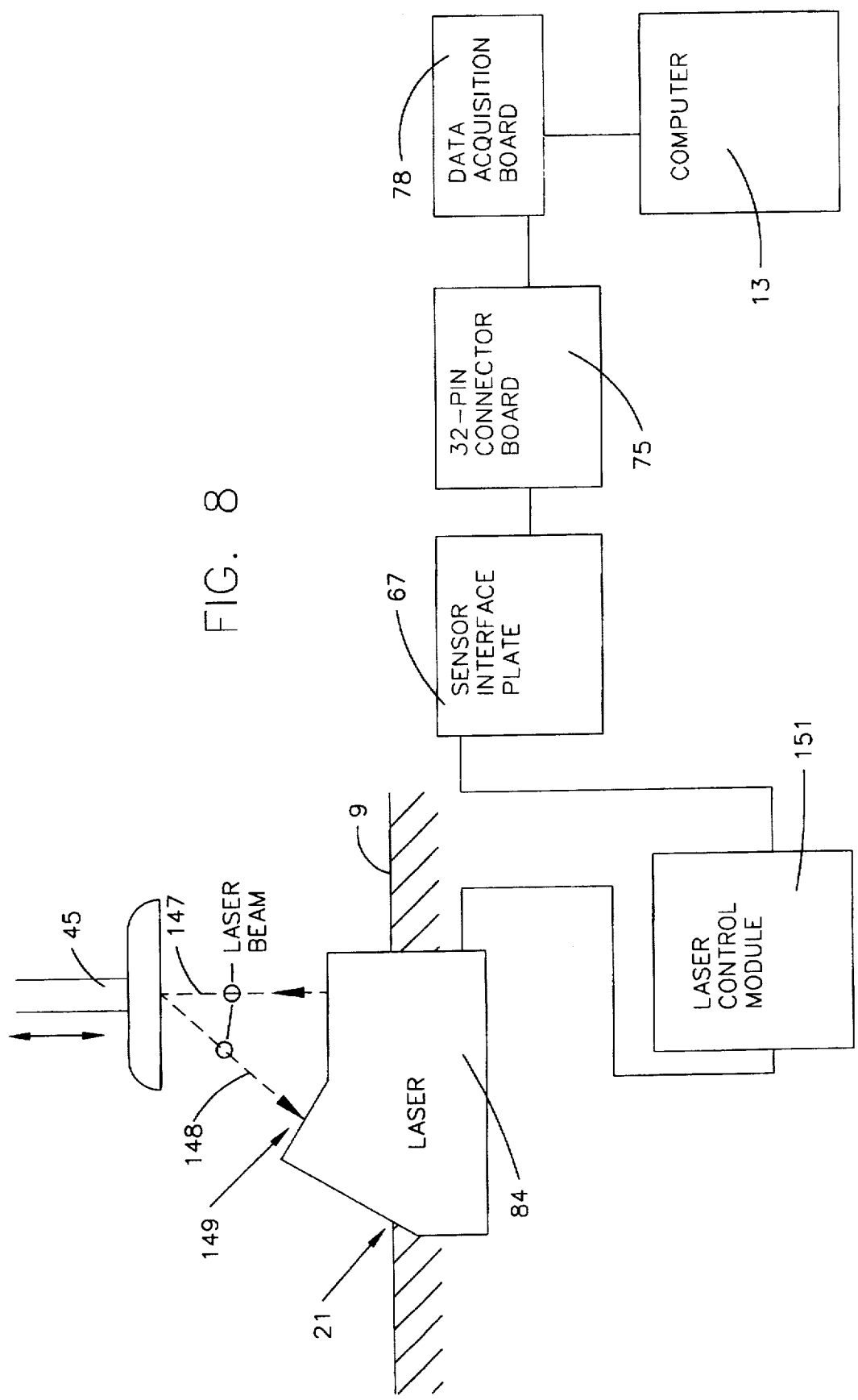
FIG. 8 is a schematical view of the laser and electrical system used for measuring valve movement in the FIG. 6 valve train testing mode.

FIG. 7 is a graph illustrating the vertical movement of valve 45 measured at two different RPM values by laser 84. The graph is centered automatically so that marker pulse Z does not need to be synchronized with top dead center. The vertical axis of the FIG. 7 graph represents vertical movement of valve 45 (see FIG. 8) in inches, while the horizontal axis represents the angular position of crankshaft 5 as determined by encoder 7. As shown in FIG. 8, laser 84 was used to take the measurements plotted in FIG. 7 indicative of the vertical movement of valve 45. Laser 84 was bolted to engine 9 at aperture 21 and connected to interface 67 by way of channel zero so that its analog output was forwarded to contact area 77 and thereafter to buffer 11 and computer 13 for analysis and plotting as shown in FIG. 7. Areas 141, where the curves are substantially flat or horizontal, indicate valve 45 in the closed position while hump 142 shows valve 45 in its open position. As can be seen, cam shaft 25 rotates once for every two rotations of crankshaft 5 thus explaining the 720 data points (i.e. encoder pulse points) on the horizontal axis in FIG. 7 defined by the pulses output from encoder 7 (encoder 7 outputs 360 pulses per revolution). Curve 143 is indicative of valve 45 movement when shaft 5 was being driven at 4,000 RPM while curve 144 shows valve 45 movement at the baseline RPM value of 3,000.

As shown in FIG. 7, both curve 143 (at 4,000 RPM) and curve 144 (at the baseline of 3,000 RPM) illustrate generally satisfactory results with respect to the behavior of valve 45 although both curves experienced slight valve bounce at closing as indicated by the small rise at 145. In the example plotted in FIG. 7, the operator set the baseline for 3,000 RPM, the low step at 1,000 RPM, the low RPM value at 7,000, the high RPM value at 8,500, and the high RPM step at 100 so as to focus in on valve behavior at the higher RPM values. Thus, the two curves plotted in FIG. 7 resulted from data taken at the baseline of 3,000 RPM and a step (4,000) between the baseline value and the low RPM value of 7,000.

Curves 143 and 144 as shown in FIG. 7 were not the result of single measurements taken by laser 84, but were plotted from the average of a plurality of measurements taken at each respective RPM value. For example, at the baseline of 3000 RPM, assuming thirty-five data cycles spanning the 720 data points were taken, the first five cycles were thrown out and curve 144 was plotted as the average of the remaining thirty cycles so as to obtain a uniform plot which is generally repeatable using the same engine at the same RPM. Curve 143 was plotted in a similar manner as were all curves herein.

Because laser 84 was used to determine the movement of valve 45 in the FIG. 7 example, no piston was present in the cylinder. By removing the piston from the cylinder, as shown in FIG. 8 laser 84 was positionable directly below valve 45 so that beam 147 directed at valve 45 and reflected therefrom to laser optical receiver area 149 indicated the position of valve 45 relative to the laser. The use of laser 84 has been found by the instant inventors to be more efficient and consistent than prior art optron cameras used to detect the valve movement. Lighting problems, vibration problems, etc. present in prior art methods have been overcome by the use of laser 84 (permanently affixed to the block in aperture 21) with its output beam 147 and reflected beam 148. Optical receiver area 149 of laser 84 measures the received intensity of beam 148 to see how far valve 45 has moved relative to laser 84. In response, laser 84 outputs a voltage value to control module 151 indicative of the valve 45 movement so as to identify vertical displacement of the valve and therefore the spring. An intensity indicative signal is also output by laser 84 indicative of how well the laser is receiving.

Laser 84 is mounted on engine block 9 in aperture 21 so as to have a direct view of the bottom of valve 45 as shown in FIG. 8. The voltage output from laser 84 goes to laser control module 151 and then to sensor interface plate 67. From sensor interface 67, the signal is forwarded to area 77 on connector board 75 and from there to data acquisition board 78 mounted in computer 13. In such a manner, the vertical movement of valve 45 is provided to buffer 11 and computer 13 for the plotting shown in FIG. 7. Laser 84 is commercially available from Trend Products, Warren, Mich., under the name "Laser Valve Tracking Device."

Figure 9A:
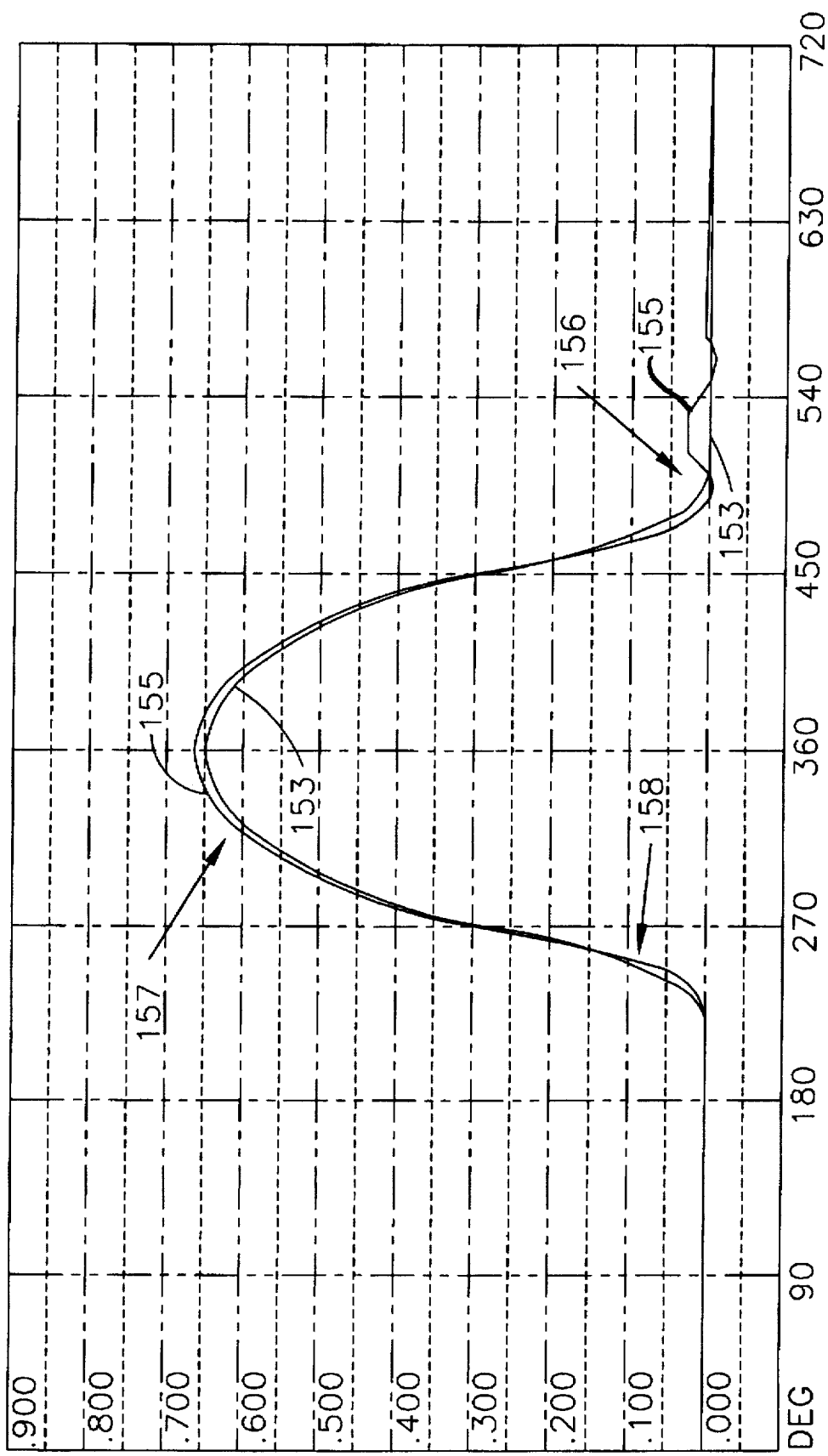
FIG. 9(a) is a graph illustrating the vertical movement of a valve within the engine in the valve train testing mode as measured by a laser at two different RPMs.

FIGS. 9(a) and 9(b) are graphs of further examples or tests performed on valve 45 movement in valve train mode 106. The horizontal axes in FIGS. 9(a) and 9(b) represent degrees of rotation of shaft 5 as in FIG. 7 while the vertical axes represent in inches the vertical movement of valve 45. Laser 84 was used to determine valve displacement with the piston being removed. In FIG. 9(a), the baseline RPM curve 153 (the thin curve) was plotted based on data taken at 3,000 RPM while the thicker curve 155 was taken at 7,000 RPM. In the FIG. 9(a) plot, the baseline was set at 3,000 RPMs, the low RPM value at 7,000, the low step at 1,000, the high RPM value at 8,500 and the high RPM step was 100. As can be seen in FIG. 9(a), valve 45 at 7,000 RPM experienced significant undesirable bounce at 156 as it closed. As will be appreciated by those of skill in the art, valve bounce is generally undesirable. Other problems noted at the 7,000 RPM level measured in FIG. 9(a) are rebound area 157 and delay area 158. Delay 158 at 7,000 RPM relative to the baseline may be caused, for example, by deflection of push rod 26 or rocker arm 27. This is undesirable. With respect to area 157, the fact that the 7,000 RPM curve 155 is substantially higher than the baseline curve 153 illustrates rebound or improper valve spring behavior. Many of these problems highlighted in FIG. 9(a) would not be possible to easily detect unless the baseline and the 7,000 RPM curves were overlaid in the plot according to this invention. This has been found to overcome many problems experienced in prior art cold testing engine measurement systems.

FIG. 9(b) shows baseline curve 159 (the thin curve) taken at 2,000 RPM and curve 160 taken at 8,200 RPM. As can be seen, the valve 45 displacement measured by the laser in FIG. 9(b) experienced significant bounce at 161, delay at 162, and rebound at 163 on curve 160. Such behavior at this high RPM level (i.e. 8,200) illustrates that this valve assembly being motored in engine 9 does not efficiently operate at this level. Accordingly, the system in the valve train mode is used to determine different valve train behavior characteristics of a particular assembly at different RPM values. Harmonic areas may also be determined using this method, especially with the overlaying of multiple curves. In such a manner, it may be determined in advance how a particular engine will handle under certain circustances with the overlaying of valve displacement plots at different RPM values simplifying the detection of problems at certain RPM levels.

Figure 10:
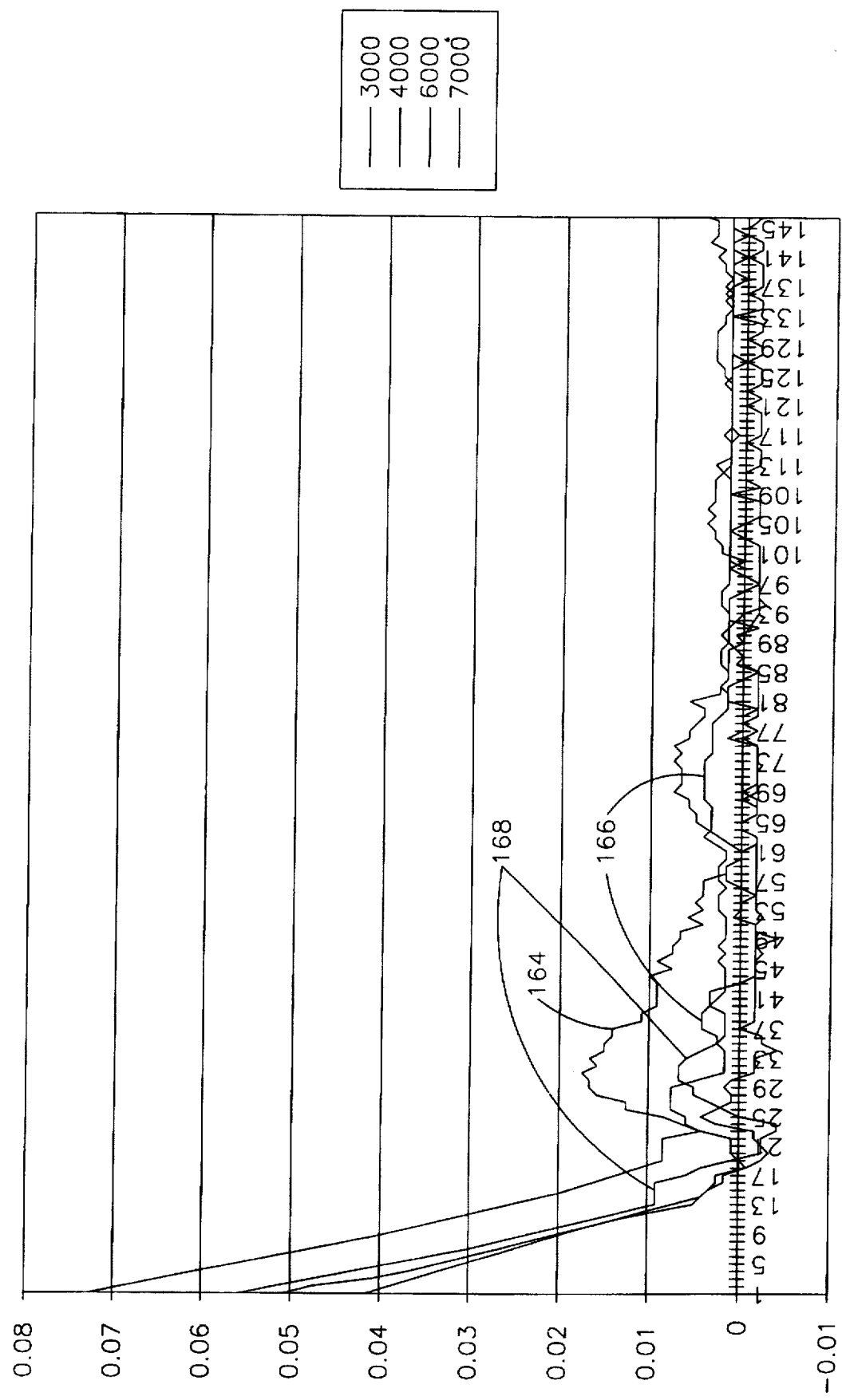
FIG. 10 is a graph which is a close-up of the bounce area of a graph illustrative of vertical movement of a valve as measured by a laser at four different RPMs.

FIG. 10 is a graph illustrating how it is possible to overlay multiple valve displacement curves on top of one another in an enlarged fashion. FIG. 10 is merely a graph similar to those of FIGS. 9(a)-9(b) enlarged in the area of valve bounce as the valve is closing. As can be seen, the valve bounce is different for valve 45 at the different RPM levels of 3,000; 4,000; 6,000; and 7,000. Curve 164 was at 7,000 RPM, curve 166 at 3,000 RPM, and curve 168 at 6,000 RPM. Note the significant bounce at 7,000 RPM.

Figure 11:
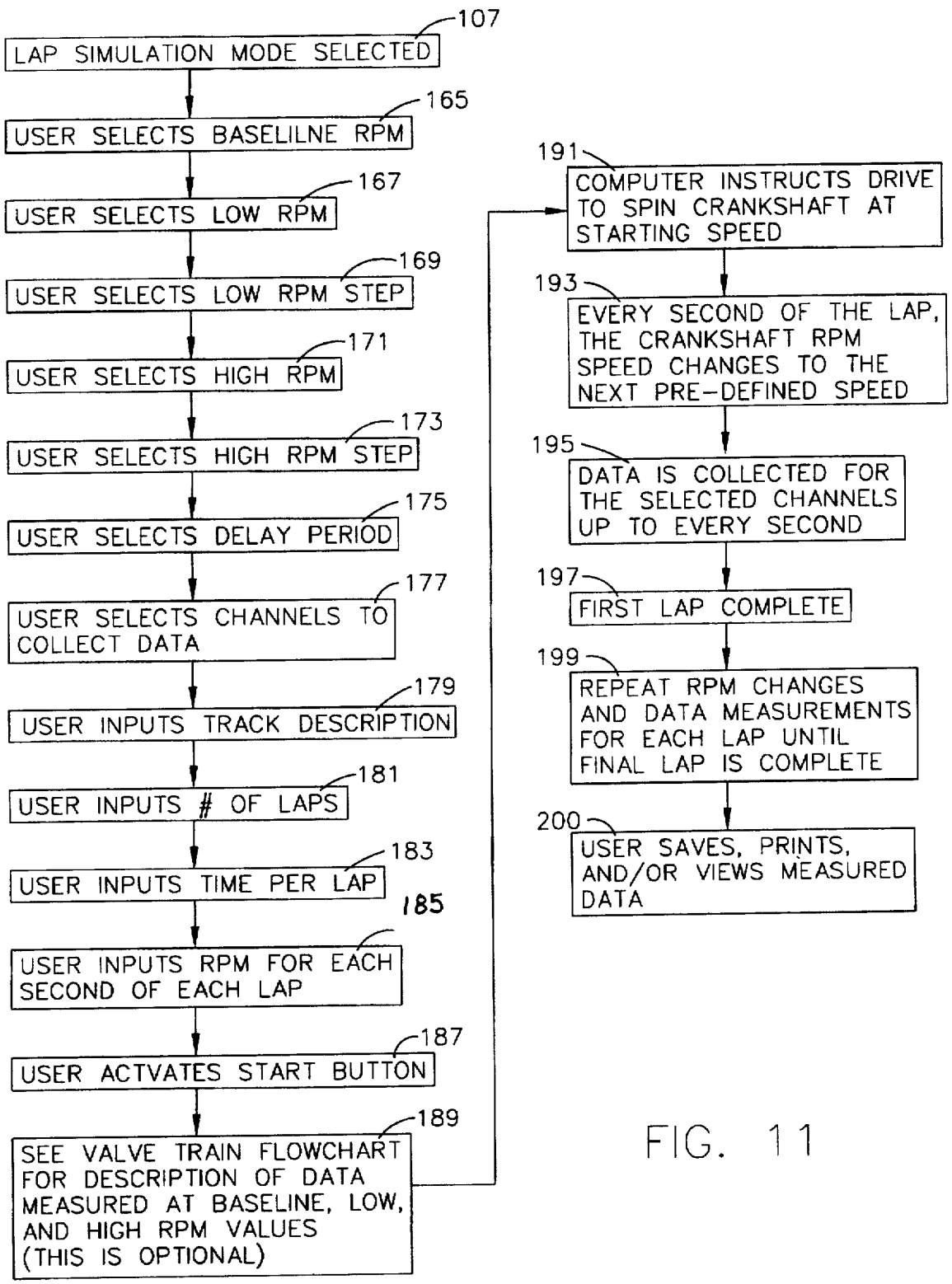
FIG. 11 is a block diagram/flowchart of the lap simulation mode of FIG. 5.

FIG. 11 is a block diagram/flowchart of the lap simulation mode. This method/system for track simulation (i.e. simulating a race) allows for a durability projection of selected engine component(s). After the user in step 103 selects lap simulation mode 107, the operator begins by selecting the baseline RPM at 165. After the baseline RPM is selected, the operator selects the low RPM value at 167 and the low RPM step value at 169. Thereafter, the high RPM value and high RPM step value are selected at 171 and 173, respectively, while the delay period is selected by the operator using computer 13 keyboard at 175. Then, the operator selects at 177 how many and which analog channels connected to interface 67 are to receive measured data in the test. Steps 165-177 are optional in lap simulation mode 107, but are sometimes used to take preliminary measurements on engine 9 before lap simulation begins.

The operator inputs at 179 a description of the track (e.g. Daytona) to be simulated. At 181, the number of laps to be run or performed is entered, the time per lap (e.g. seconds per lap) is entered at 183, and the specific RPM value for each second (or time period) of each lap is entered at 185. All laps are simulated in identical fashion. In such a manner, the user may customize or simulate anticipated running conditions or a race by entering the expected RPM for each second of each lap to be run. By analyzing data taken during such lap simulations, the operator may determine how a particular engine (or component(s) thereof) will hold up during a race, for example.

After the lap simulation data has been selected in steps 179-185, the operator actuates the start button at 187 at which time the system begins to function automatically. Step 189 is optional depending upon whether steps 165-175 are performed. If they were, then the selected analog sensors output data to be analyzed in said step 189 in a manner similar to that shown in and described with respect to FIG. 6.

Thereafter, or when only a lap simulation is to be run, computer 13 instructs drive motor 3 to spin shaft 5 at the starting speed at 191. In other words, motor 3 drives engine 9 at the speed selected for the first second or other time period of each lap. As shown at 193, drive controller 15 instructs motor 3 to adjust the RPM value of shaft 5 and engine 9 during each second (or other time period) of the lap so that the RPM value at which the engine is run coincides with that selected at 185 for each second of each lap. Data is collected from the different analog sensors used (e.g. laser) at intervals up to each time period or second of every lap. After the first lap has been completed at 197, the RPM values and lap runs are repeated at 199 for the number of times selected in step 181. After running of the last lap, the user may save, print, and/or view measured data at 200 as discussed above as to valve train behavior or other sensor data. The operator may also view data on a real-time basis on the display screen during lap simulation.

Figure 12:
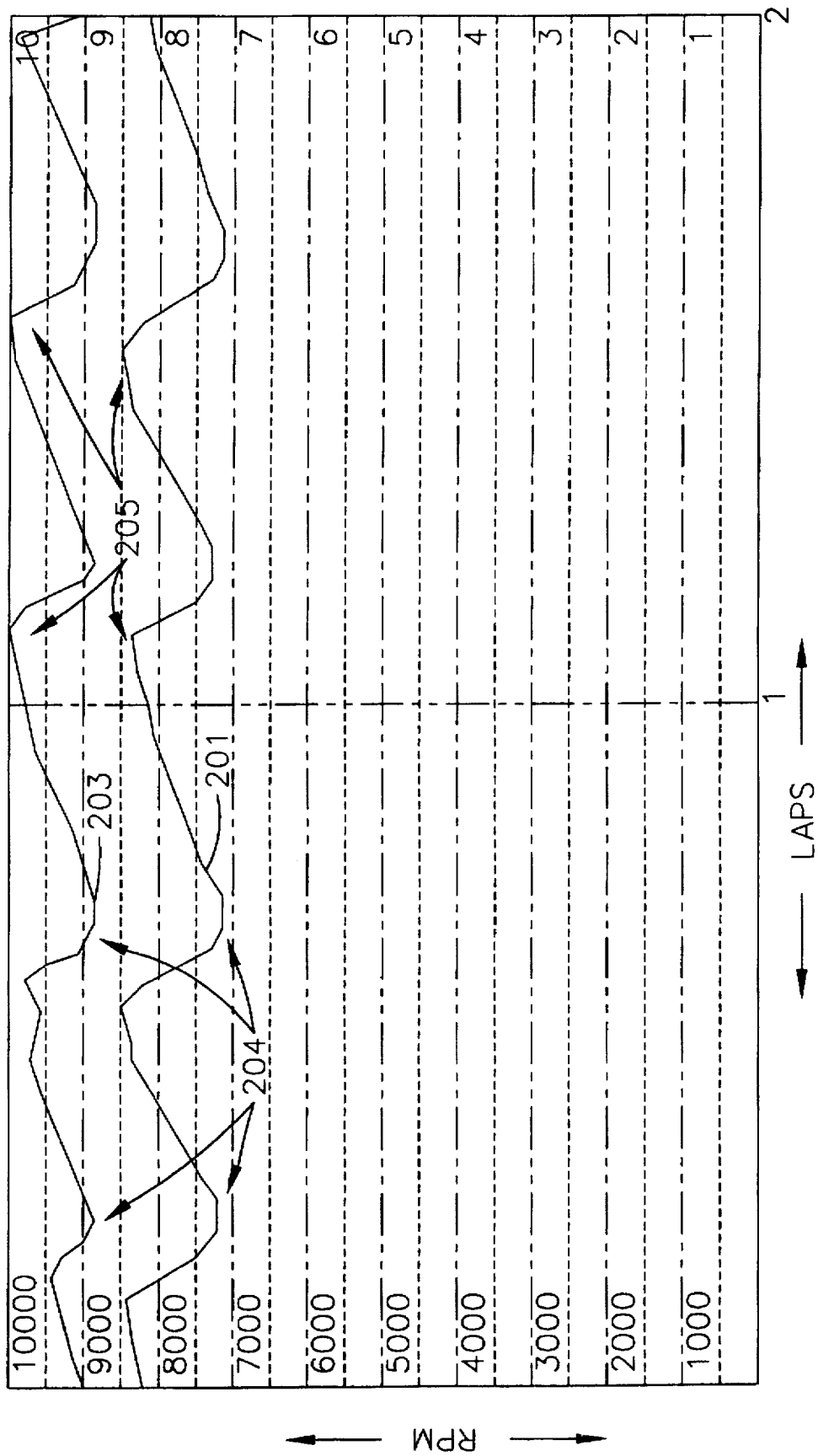
FIG. 12 is a graph illustrating requested and actual RPMs during a two-lap operation of the lap simulation mode.

FIG. 12 is a graph illustrating RPM values measured and requested for each second of a two lap simulation (31 seconds per lap). The vertical axis is indicative of the RPM value while the horizontal axis shows the simulation of two laps. Curve 201 illustrates RPM values selected in step 185 for each second of the two laps run in the FIG. 12 simulation. Meanwhile, curve 203 is a result of actual measured RPM values of an engine motored for two laps. Curves 201 and 203 have no relation to one another. In the normal case, the requested curve 201 and the actual measured curve will correspond nearly identically. However, for purposes of example and illustration, two separate curves are shown in FIG. 12, curve 201 illustrating a requested lap simulation and curve 203 illustrating a two lap simulation actually run with the time periods being seconds. As will be appreciated by those of skill in the art, low points 204 on curves 201 and 203 generally represent the mid-point of turns in the racetrack described in steps 179-185 while peaks 205 typically represent the end of straightaway sections of the racetrack described in steps 179-185.

The instant inventors have found a general desire in the art for a lap or auto race simulation system and method as described herein. For example, an operator may test particular components of an engine through 500 laps of a particular racetrack as simulated for the purpose of determining how such components will hold up during the actual race. Likewise, while different components of engine 9 may be tested in such a manner, the engine as a whole may also be analyzed to see how it will perform on certain racetracks under pre-set conditions.

While FIG. 12 merely illustrates RPM valves as requested and measured in the lap simulation mode, a plurality of analog sensors 86-92 corresponding to the channels of interface 67 may also be utilized in the lap simulation mode so that different components of engine 9 may be tested in lap simulation, with all data being overlaid on the same display in certain embodiments. Such analog sensors function to permit the operator to analyze measured data as described above.

Figure 13:
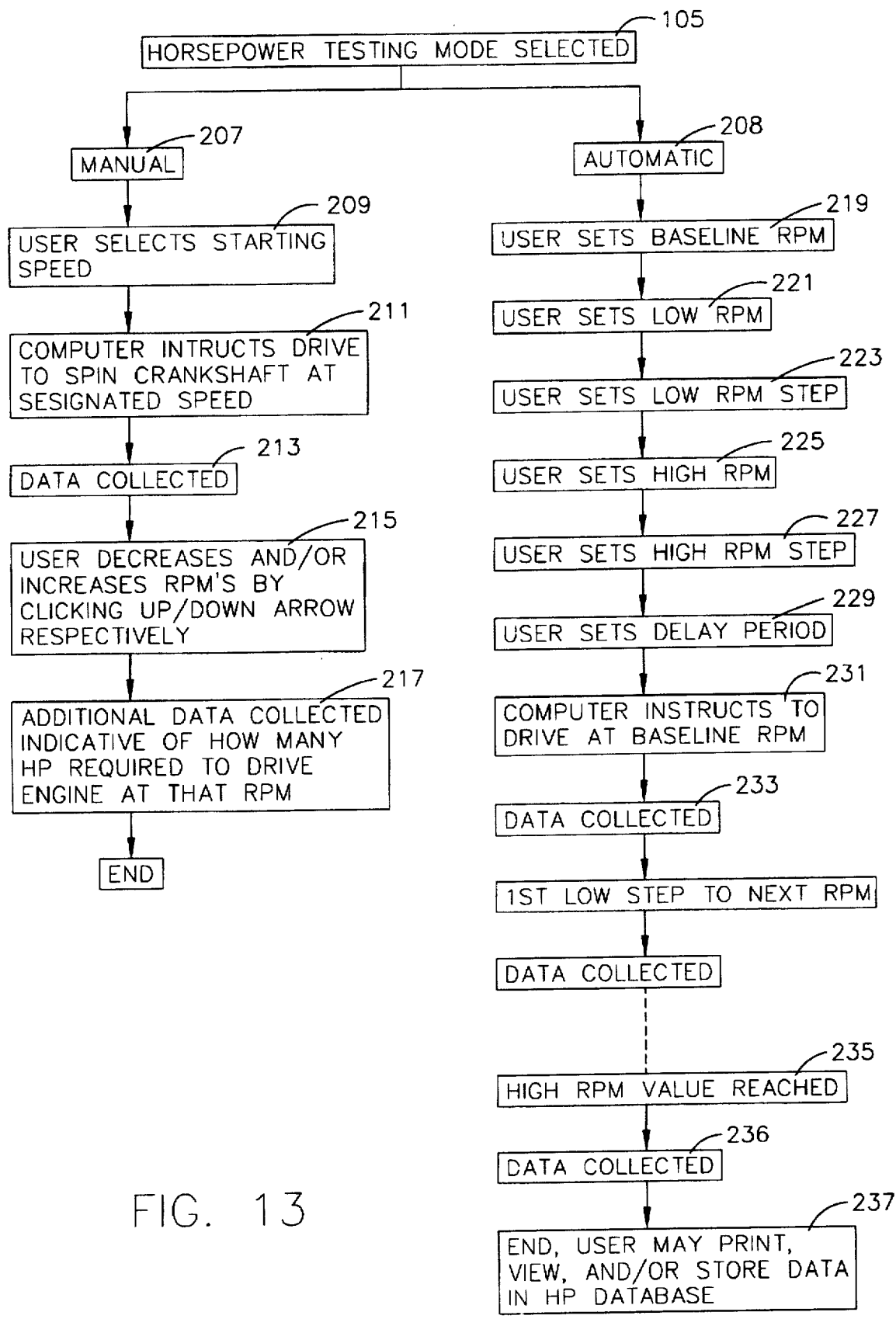
FIG. 13 is a block diagram/flowchart of the horsepower testing mode shown in FIG. 5.

FIG. 13 is a block diagram/flowchart of the horsepower testing mode selected by the operator in step 103. After mode 105 has been selected, the operator may choose from either manual mode 207 or automatic mode 208.

In accordance with manual mode 207 of the horsepower testing mode, the operator begins at 209 by selecting the engine 9 starting speed by using the keyboard of computer 13. Thereafter, computer 13 instructs drive motor 3 to spin shaft 5 and thus engine 9 at the selected speed at 211. Data is then collected from the analog sensors, if any, in operation with interface 67 in engine 9. Data from the sensors as well as the amount of horsepower used by drive 3 to drive shaft 5 is collected at 213. In such a manner, the operator can tell how much horsepower is required to drive engine 9 at particular RPM values. Such monitoring is used, for example, to determine which components of engines if replaced by other components, cause more or less horsepower to be used. This horsepower analysis or monitoring is essentially a friction analysis.

At step 215, the operator may decrease or increase the engine RPM value by clicking down or up respectively using the Windows based software in computer 13. In such a manner, additional horsepower and/or other data may be collected at a plurality of different RPMs and overlaid on a graph as discussed above. Additional data indicative of how many horsepower required to drive engine 9 may be collected at different RPMs as shown in step 217.

Now let us assume that the operator has chosen automatic mode 208 as opposed to manual mode 207. The operator begins the automatic mode by selecting the baseline RPM at 219 and then the low RPM value at 221. After the low RPM step is selected at 223, the high RPM value at 225 and the high RPM step at 227 are selected by the operator using the keyboard of computer 13. The operator sets the delay period at 229. Thereafter, computer 13 automatically instructs drive 3 to motor engine 9 at the baseline RPM value selected in step 219 at 231. Horsepower data and/or other analog data is then collected at 233. Computer 13 then instructs drive 3 to step the RPM value upwardly by an amount equal to the RPM value selected in step 223 so that data may be taken at the next RPM level. After the high RPM value is finally reached at 235 and data collected 236, the user at 237 may print, view, and/or store the data in, for example, a horsepower database.

Figure 14:
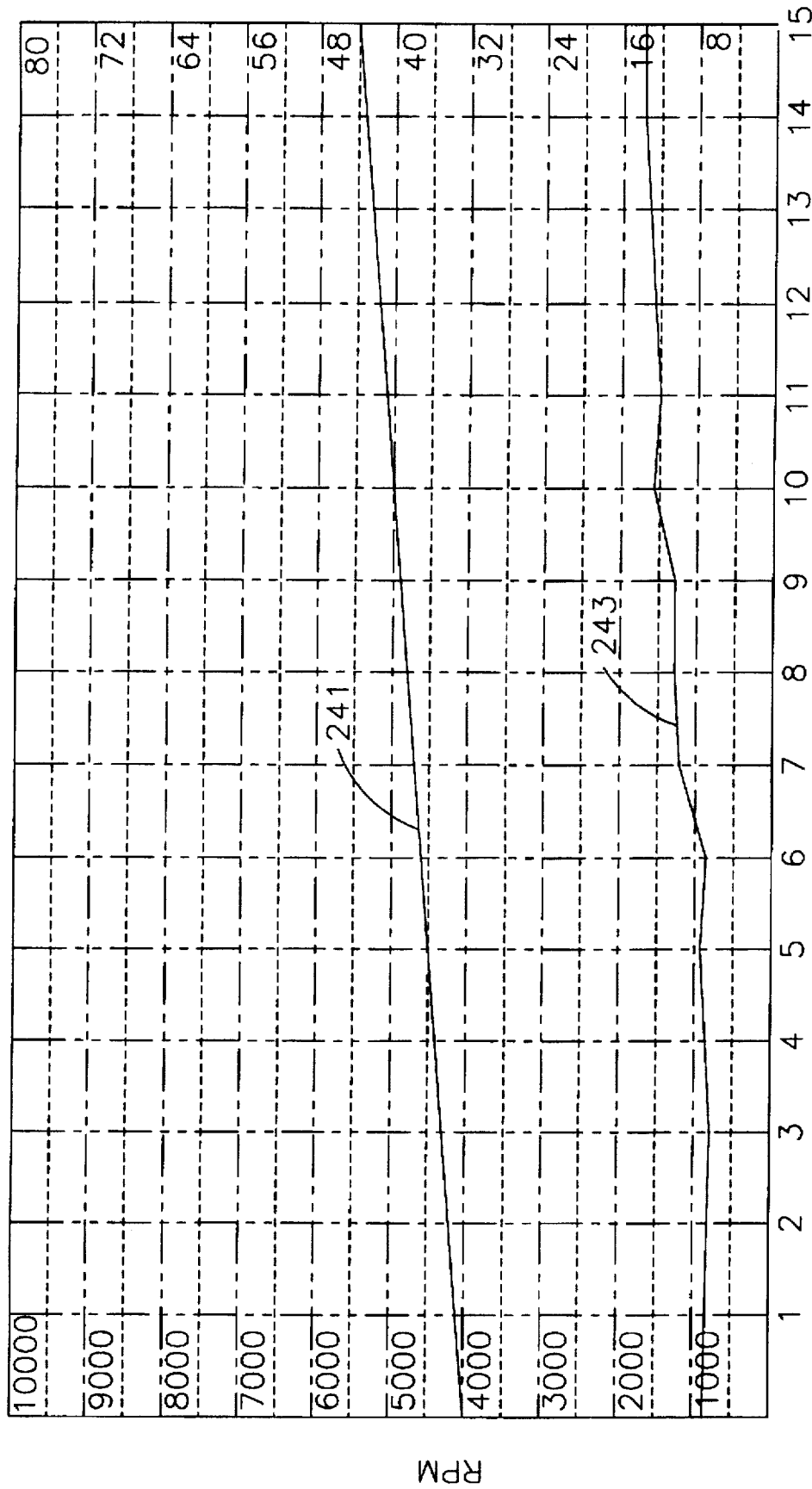
FIG. 14 is a graph illustrating the horsepower required to run the engine at pre-set RPMs as found during a fifteen time period test in the horsepower testing mode.

FIG. 14 is a graph of horsepower testing mode 105 in the automatic state 208. The left hand vertical axis from 1,000 to 10,000 of the FIG. 14 graph represents RPM values, the horizontal axis representing test points, and the right hand vertical axis representing the horsepower required to drive engine 9 at tested RPM values. Curve 241 is indicative of the horsepower range tested in this example. As can be seen, engine 9 by way of motoring drive 3 was run from 4,000 RPM all the way up to 5,500 RPM throughout the course of the test shown in FIG. 14. Meanwhile curve 243 shows the horsepower required to drive engine 9 at the corresponding RPM values. Test data was taken every 100 RPMs as can be seen from the horizontal axis in FIG. 14 which illustrates 15 different test points. For example, about 7 horsepower was required to run engine 9 at the RPM value of 4,100 while about 14 horsepower was required at test point 15 to run engine 9 at 5,500 RPM. Taking an example in the middle, at test point 8, about 10.5 horsepower was required to run engine 9 at 4,800 RPM.

Once given the above disclosure, therefore various other modifications, features or improvements will become apparent to the skilled artisan. Such other features, modifications, and improvements are thus considered a part of this invention, the scope of which is to be determined by the following claims:

We claim:

1. A method of testing valve movement in an engine being motored by an external drive, the method comprising the steps of:

motoring the engine to be tested by way of an external drive motor at a first RPM value so that a valve within the engine moves vertically upward and downward when the engine is motored;

affixing a laser sensor to the engine;

causing a laser beam from the laser to be directed at the bottom of the valve as the engine is being motored so that the laser outputs a signal indicative of the vertical movement of the valve;

forwarding the signal from the laser to a computer; and plotting a first curve in graph form indicative of the valve movement detected by the laser so that the operator can determine whether the valve is operating properly when the engine is being motored at the first RPM value.

2. The method of claim 1, further comprising the steps of:

measuring vertical movement of the valve using the laser at a second engine RPM value;

plotting a second curve in the graph form indicative of the valve movement detected by the laser at the second RPM value;

overlaying the first and second curves on a graph; and analyzing the first and second curves on the graph so as to compare the valve behavior at the first RPM value relative to the valve behavior at the second RPM value.

3. The method of claim 2, further comprising the steps of:

selecting a baseline RPM value;

selecting a low RPM value;

selecting a low RPM step value;

selecting a high RPM value;

selecting a high RPM step value;

measuring valve movement using the laser at the baseline RPM value, the first RPM value being equal to the baseline value;

increasing the RPM value by an amount equal to the low RPM step value to the second RPM value;

measuring valve movement at the second RPM value;

increasing the RPM value by an amount equal to the low RPM step value until the low RPM value is reached;

measuring the valve movement at the low RPM value and then increasing the RPM value by an amount equal to the high RPM step value to a third RPM value;

measuring valve movement at the third RPM value and then increasing the RPM value by increments equal to the high RPM step value until reaching the high RPM value;

measuring the valve movement at the high RPM value; and halting motoring of the engine by stopping the external drive motor.

4. A method of testing components of an engine by motoring the engine to be tested using an external drive motor, the method comprising the steps of:

motoring the engine using an external drive motor which drives a shaft rotatably mounted in the engine until the engine reaches a first RPM value;

using a laser mounted proximate the engine valve train to detect and measure valve train movement;

testing the valve train of the engine at the first RPM value and outputting a first data signal indicative thereof;

increasing the engine RPM value to a second RPM value;

testing the valve train of the engine at the second RPM value using the laser and outputting a second data signal indicative thereof;

increasing the engine RPM value to a third RPM value and testing the valve train at the third RPM value, and outputting a third data signal indicative thereof; and overlaying three different curves developed from the first, second, and third data signals respectively on a single graph so as to analyze the behavior of the valve train at the first, second, and third RPM values relative to one another.

5. The method of claim 4, further comprising the steps of:

using an analog sensor to perform said testing steps;

forwarding an analog signal from the sensor to a sensor interface after testing at each RPM value;

sending the analog signal from the sensor interface to a buffer memory after each testing step where the signal is stored for a period of time;

retrieving the signal from the buffer and storing it in a computer memory; and plotting each signal in the form of a graph in order to allow the operator to evaluate and analyze the valve train's behavior at the first, second, and third RPM values.

6. A system for testing various components or requirements of an engine, the system comprising:

an external drive motor for motoring the engine to be tested by way of a shaft rotatably mounted in the engine so that a cam shaft in the engine rotates with said shaft driven by said external drive motor;

a computer including a display screen for permitting an operator to view graphical test data received from sensors mounted within the engine;

valve train testing means for measuring vertical displacement of at least one valve in the engine during motoring of the engine at first and second RPM values, said valve train testing means forwarding signals indicative of valve displacement to said computer so that movement of the valve at said first and second RPM values is simultaneously displayed to the operator on said display screen thereby allowing the operator to visually compare behavior of the valve at the first and second RPM values;

lap simulation testing means for automatically motoring the engine for a predetermined number of laps around a simulated track at predetermined RPM values at a plurality of predetermined time periods defining each of said laps, and testing at least one component of the engine during each of said time periods during each lap thereby allowing the operator to analyze the behavior of the component being tested under simulated race conditions at different RPM values;

an encoder attached to said shaft for outputting data indicative of the angular position of said shaft during motoring of said engine;

a tachometer and a manual stop button for allowing the operator to visually monitor the RPM value at which the engine is motoring and for stopping motoring of the engine respectively;

an oil pump and an oil filter for causing oil to be circulated to and from the engine during motoring so as to lubricate same; and a divide-by-six device disposed between said encoder and a corresponding drive controller, said drive controller being in communication with said encoder, said drive motor, and said computer.

7. The system of claim 6, further comprising horsepower testing means for automatically determining how many horsepower are required to motor the engine at a plurality of different RPM values.

8. The system of claim 7, further comprising means for allowing the operator to choose one of said horsepower testing means, said lap simulation testing means, and said valve train testing means for automatic operation so that only one of the three testing modes is functioning at a time.

9. The system of claim 6, further comprising a plurality of analog sensors located in the engine and connected to an analog sensor interface so that a plurality of different components in the engine can be tested simultaneously and displayed on the display screen at the same time.

10. The system of claim 9, further comprising a buffer for storing data forwarded from said sensors so that the display screen portrays graphical test data in non-real time.

11. An apparatus for motoring an engine and performing tests upon components thereof, the apparatus comprising:

an external drive motor for motoring the engine to be tested by way of a crankshaft;

a belt extending from said drive motor to said crankshaft so as to allow said motor to drive said crankshaft which in turn is adapted to drive reciprocatory components within the engine to be tested;

an encoder attached to said crankshaft for indicating the angular position of same;

a cabinet housing said external drive motor, said belt, and said encoder;

an adapter plate to be disposed between the engine and said cabinet thereby allowing different engines to be mounted on said cabinet in order to allow the attached engine to be motored by said external drive motor; and a laser to be mounted on the engine in an aperture defined therein below the valve train so as to detect movement of the valve train during motoring.

12. The apparatus of claim 11, further comprising an oil pump and oil filter located in said cabinet for pumping lubricating oil to and from the engine during motoring.

* * * * *